United States Patent
Rosa

(10) Patent No.: US 10,739,375 B2
(45) Date of Patent: Aug. 11, 2020

(54) ACCELERATION MEASURING DEVICE AND METHOD OF MANUFACTURING OF SAID ACCELERATION MEASURING DEVICE

(71) Applicant: KISTLER HOLDING AG, Winterthur (CH)

(72) Inventor: Flavio Rosa, Baden (CH)

(73) Assignee: KISTLER HOLDING AG, Winterthur (CH)

( * ) Notice: Subject to any disclaimer, the term of this patent is extended or adjusted under 35 U.S.C. 154(b) by 100 days.

(21) Appl. No.: 15/776,702

(22) PCT Filed: Nov. 24, 2016

(86) PCT No.: PCT/EP2016/078608
§ 371 (c)(1),
(2) Date: May 16, 2018

(87) PCT Pub. No.: WO2017/093099
PCT Pub. Date: Jun. 8, 2017

(65) Prior Publication Data
US 2018/0328958 A1    Nov. 15, 2018

(30) Foreign Application Priority Data
Dec. 4, 2015 (EP) .................................... 15198027

(51) Int. Cl.
*G01P 15/09*  (2006.01)
*G01P 15/08*  (2006.01)

(52) U.S. Cl.
CPC ...... *G01P 15/0907* (2013.01); *G01P 15/0802* (2013.01)

(58) Field of Classification Search
CPC ............. G01P 15/0907; G01P 15/0802; G01P 15/0915; G01P 15/0922; G01P 15/09
(Continued)

(56) References Cited

U.S. PATENT DOCUMENTS

| | | | | |
|---|---|---|---|---|
| 3,429,031 A | * | 2/1969 | Kistler | ...................... G01L 1/16 29/595 |
| 3,673,442 A | * | 6/1972 | Sonderegger | ............. G01L 1/16 310/329 |

(Continued)

FOREIGN PATENT DOCUMENTS

| | | |
|---|---|---|
| CH | 3999021 A | 3/1966 |
| CN | 103675341 | 3/2014 |

(Continued)

OTHER PUBLICATIONS

Russian Office Action and Search Report and English Translation thereof, RU Application No. 2018120488/28(032305), dated Apr. 24, 2019, 16 pages.

(Continued)

*Primary Examiner* — Robert R Raevis
(74) *Attorney, Agent, or Firm* — Dority & Manning, P.A.

(57) ABSTRACT

An acceleration measuring device includes a piezoelectric system, a seismic mass, and a base plate. During acceleration of the device, the seismic mass exerts onto the piezoelectric system a force that is proportional to the acceleration of the device. The force causes the piezoelectric system to generate piezoelectric charges that can be electrically processed as acceleration signals. The piezoelectric system includes two system elements, and the seismic mass correspondingly includes two mass elements. The device includes a preloading assembly that mechanically preloads the system elements against the mass elements.

14 Claims, 9 Drawing Sheets

(58) Field of Classification Search
USPC .................... 73/514.34, 862.381–862.68;
310/311–371
See application file for complete search history.

(56) References Cited

U.S. PATENT DOCUMENTS

| | | | |
|---|---|---|---|
| 3,744,322 | A | 7/1973 | Pacey et al. |
| 4,016,437 | A * | 4/1977 | Calderara .................. G01L 1/16 |
| | | | 310/338 |
| 4,492,607 | A * | 1/1985 | Halcomb ............... B29C 70/083 |
| | | | 156/242 |
| 4,503,351 | A | 3/1985 | Sonderegger et al. |
| 5,631,421 | A | 5/1997 | Ohgke et al. |
| 6,105,434 | A | 8/2000 | Engeler |
| 7,546,774 | B2 | 6/2009 | Cavalloni et al. |
| 8,816,570 | B1 * | 8/2014 | McConnell ......... G01P 15/0922 |
| | | | 310/331 |
| 8,915,139 | B1 * | 12/2014 | McConnell ......... G01P 15/0922 |
| | | | 73/514.34 |
| 9,841,434 | B2 | 12/2017 | Sonderegger et al. |
| 2001/0016233 | A1 * | 8/2001 | Sugimori ................. H03H 3/02 |
| | | | 427/512 |
| 2005/0163630 | A1 * | 7/2005 | Hoshino ............. F04C 29/0085 |
| | | | 417/410.3 |
| 2014/0060209 | A1 * | 3/2014 | Broillet .................. G01H 11/08 |
| | | | 73/862.68 |

FOREIGN PATENT DOCUMENTS

| | | |
|---|---|---|
| DE | 2712359 A1 | 10/1997 |
| GB | 1522785 | 8/1978 |
| JP | H 08-502821 | 3/1996 |
| KR | 1992-0004497 | 7/1992 |
| SU | 794539 | 1/1981 |
| SU | 1809392 | 4/1993 |

OTHER PUBLICATIONS

International Search Report (PCT/EP2016/078608), dated Jan. 16, 2017.
Opinion of the International Search Authority (PCT/EP2016/078608).
Korean Office Action, Patent Application No. 10-2018-7015031, dated Apr. 29, 2019, 12 pages.

* cited by examiner

ACCELERATION MEASURING DEVICE AND METHOD OF MANUFACTURING OF SAID ACCELERATION MEASURING DEVICE

CROSS-REFERENCE TO RELATED APPLICATIONS

This application claims priority to International Application Serial No. PCT/EP2016/078608, filed Nov. 24, 2016, which claims priority to EP Application No. 15198027.3, filed Dec. 4, 2015. International Application Serial No. PCT/EP2016/078608 is hereby incorporated herein in its entirety for all purposes by this reference.

TECHNICAL FIELD

The invention relates to an acceleration measuring device as well as to a method of manufacturing of said acceleration measuring device.

BACKGROUND

Document CH399021A demonstrates an acceleration measuring device comprising a piezoelectric system, a seismic mass, a preloading sleeve, and a base plate. The piezoelectric system is mechanically preloaded between the seismic mass and the base plate by means of the preloading sleeve. During acceleration, the seismic mass exerts a force on the piezoelectric system that is proportional to its acceleration. Both positive and negative accelerations can be detected due to the mechanical preloading. The force itself generates piezoelectric charges in the piezoelectric system that can be electrically picked up as acceleration signals. These acceleration signals are proportional to the amount of the force. Acceleration signals that have been electrically picked up can be electrically amplified and evaluated in an evaluation unit.

Such an acceleration measuring instrument for measuring shock and vibration is commercially distributed by the applicant with the type designation 8002K. The acceleration measuring device is arranged in a mechanically robust housing made of stainless steel. According to data sheet No. 8002_00_205d_07.05 it has a weight of 20 grams and can be attached to any measured object by means of a mounting bolt. The measuring range is in the range of ±1000 g, the resonance frequency is 40 kHz and the operating temperature ranges from −70° C. up to +120° C.

It is a first object of the present invention to improve this well-known acceleration measuring device. Another object of the invention is to provide a cost-effective method of manufacturing such acceleration measuring instrument.

BRIEF SUMMARY OF THE INVENTION

The first object has been achieved by an acceleration measuring device having a piezoelectric system with two piezoelectric elements that are preloaded against two mass elements.

The invention relates to an acceleration measuring device comprising a piezoelectric system, a seismic mass, and a preloading assembly. When the acceleration measuring device undergoes acceleration, the seismic mass exerts a force on the piezoelectric system that is proportional to its acceleration, wherein said force generates piezoelectric charges in the piezoelectric system and wherein said piezoelectric charges can be electrically picked up as acceleration signals. The piezoelectric system includes two system elements and the seismic mass comprises two mass elements. The preloading assembly mechanically preloads said system elements against said mass elements.

The advantage of the seismic mass consisting of two mass elements is that the piezoelectric system can be mechanically preloaded because of the arrangement of the system elements between the mass elements and no further components such as a base plate are necessary to achieve mechanical preloading. The preloading assembly mechanically preloads the piezoelectric system comprising two system elements against the mass elements. In this way, the resulting piezoelectric transducer assembly can be subjected to electrical and mechanical testing and storing prior to mounting. Therefore, manufacturing of the acceleration measuring device is cost-effective.

BRIEF DESCRIPTION OF THE DRAWINGS

In the following, an embodiment of the invention will be explained in more detail with reference to the Figures in which.

DESCRIPTION OF EXEMPLARY EMBODIMENTS

Figure 1:
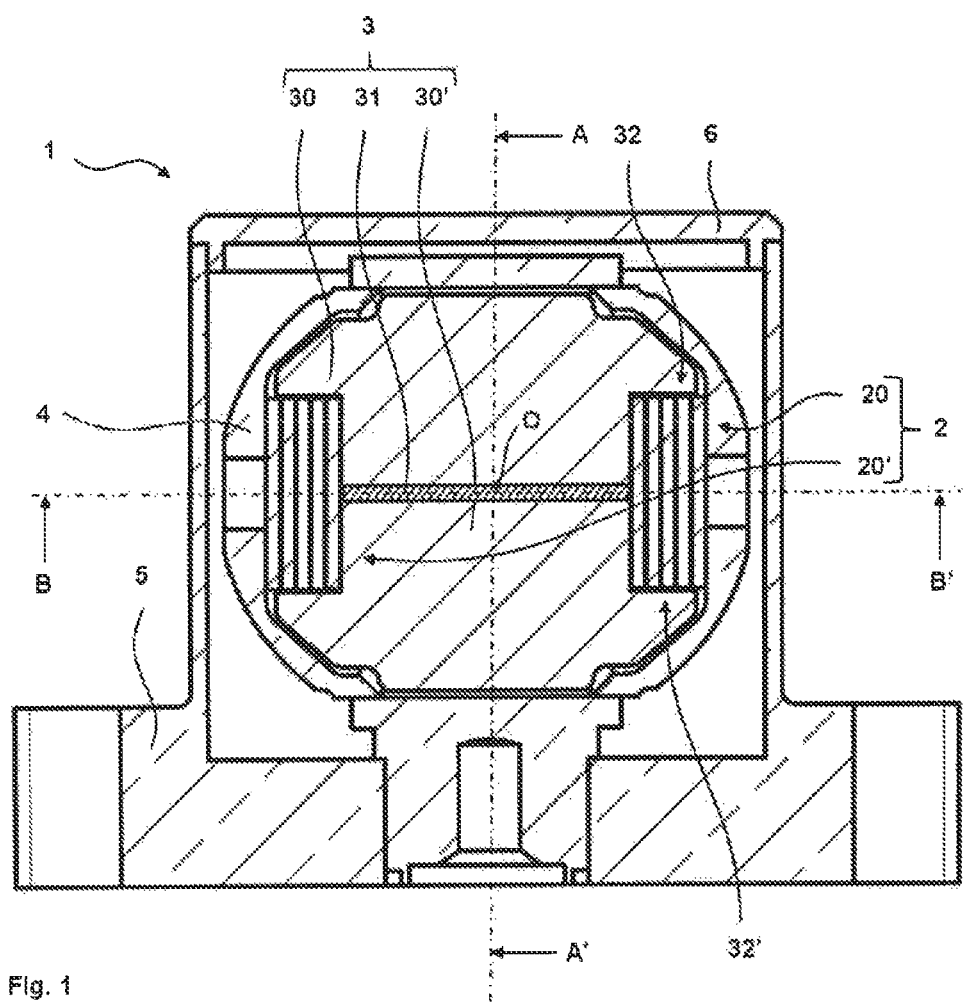
FIG. 1 shows a portion of the acceleration measuring instrument in cross section.

FIG. 1 shows a portion of an embodiment of the acceleration measuring device 1 in cross section. The section extends along the vertical axis AA' and a longitudinal axis BB'. A horizontal axis CC' of the acceleration measuring device 1 is shown in the perspective view thereof according to FIG. 2. The three axes extend perpendicular to each other and intersect in a center O of the acceleration measuring device 1.

As shown in FIG. 1, the acceleration measuring device 1 comprises a housing 5 and a cover 6 made of mechanically resistant material such as pure metals, nickel alloys, cobalt alloys, iron alloys, etc. With respect to the vertical axis AA' the housing 5 has a hollow cylindrical shape in cross section while the cover 6 is circular in cross section. Those skilled in the art knowing the present invention may also provide a housing and a cover having different cross sectional shapes such as a polygon, etc. The housing 5 and cover 6 are mechanically connected to each other. The mechanical connection is achieved by material bonding such as welding, diffusion welding, thermocompression bonding, soldering, etc. The housing 5 and cover 6 protect the acceleration measuring device 1 from harmful environmental conditions such as contamination (dust, moisture, etc.) and from electric and electromagnetic interference effects in the form of electromagnetic radiation.

The acceleration measuring device 1 comprises a seismic mass 3. The seismic mass 3 is spherical in shape and is arranged around the center O and comprises a plurality of, preferably two mass elements 30, 30' as well as an electrical insulation 31. The mass elements 30, 30' are made of mechanically resistant materials such as pure metals, nickel alloys, cobalt alloys, iron alloys, etc. The electrical insulation 31 is made of electrically insulating and mechanically rigid material such as ceramics, $Al_2O_3$ ceramics, sapphire, etc. With respect to the vertical axis AA', the mass elements 30, 30' are cylindrical in cross section while the electrical insulation 31 is rectangular in cross section. However, those skilled in the art knowing the present invention may also provide mass elements and an electrical insulation with different cross sectional shapes such as a polygon, a circle, etc. Mass elements 30, 30' preferably are identically configured. With respect to the vertical axis AA', the electrical insulation 31 is arranged between the mass elements 30, 30' and electrically insulates the mass elements 30, 30' from one another. The mass elements 30, 30' and electrical insulation 31 are in direct mechanical contact with each other. An insulation resistance of the electrical insulation 31 is higher than or equal to $10^{10}\Omega$. The mass elements 30, 30' can be easily electrically and mechanically connected to each other due to their spatial extension. At both opposite ends with respect to their longitudinal axis, the mass elements 30, 30' comprise recesses 32, 32'. These recesses 32, 32' are rectangular in cross section with respect to the longitudinal axis BB'. However, also in this case those skilled in the art knowing the present invention may provide different cross sectional shapes such as a circle, etc.

The acceleration measuring device 1 comprises a piezoelectric system 2. The piezoelectric system 2 comprises a plurality of, preferably two system elements 20, 20'. These system elements 20, 20' are identical in construction. The construction of the system elements 20, 20' is shown in the diagram according to FIG. 5. Each system element 20, 20' comprises a plurality of electrical insulator elements 21, 21', a plurality of electrodes 22, 22', and a plurality of piezoelectric elements 23, 23', 23". Preferably, each system element 20, 20' comprises two electrical insulator elements 21, 21'. The electrical insulator elements 21, 21' are rectangular in cross section with respect to the longitudinal axis BB' and are made of electrically insulating and mechanically rigid materials such as ceramics, $Al_2O_3$ ceramics, sapphire, etc. An insulation resistance of the electrical insulator elements 21, 21' is greater than/equal to $10^{10}\Omega$. Furthermore, the electrodes 22, 22' are also rectangular in cross section with respect to the longitudinal axis BB' and are made of electrically conductive material such as pure metals, nickel alloys, cobalt alloys, iron alloys, etc.

Figure 5:
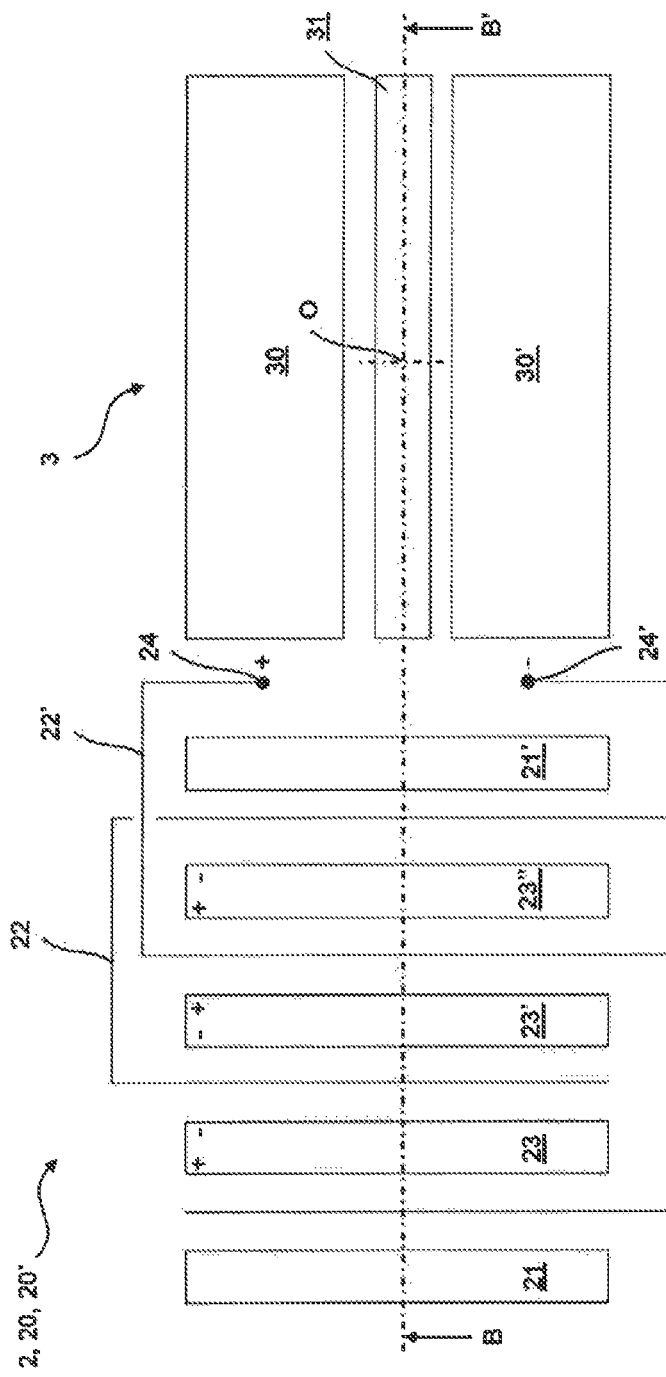
FIG. 5 shows a diagram of the electrical connection of the piezoelectric system to the seismic mass of the acceleration measuring device according to FIG. 1 or 2.
Figure 6:
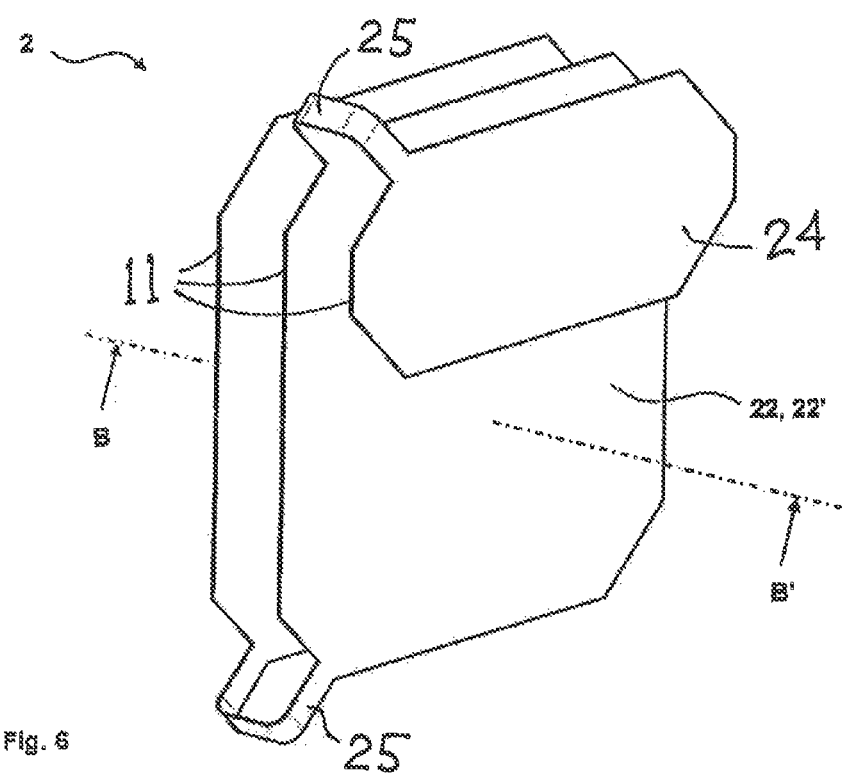
FIG. 6 shows a perspective view of an electrode of the piezoelectric system of the acceleration measuring device according to FIG. 1 or 2.

FIG. 6 shows a perspective view of an electrode 22, 22'. Preferably, each system element 20, 20' comprises two electrodes 22, 22'. Each electrode 22, 22' is made of one single piece and comprises a plurality of, preferably three electrode leaves 11 that are thin and planar and disposed to lie spaced apart from each other in parallel planes while mechanically connected to one another by a plurality of, preferably two hinges 25. As schematically shown in FIG. 6, a pair of the leaves 11 connected by a hinge 25 are coextensive in shape and area, while a third leaf 11 connected to the intermediate leaf 11 is only about half the area of the other two leaves 11. The intermediate leaf 11 is connected to each of the other leaves by a hinge 25 and thus is connected to two hinges 25, while each of the other leaves 11 is only connected by a single hinge 25. The half area leaf 11 is disposed on one end of the electrode 22, 22' and thus is given a separate designation as an end 24 of the electrode 22, 22'. On its electrode surfaces of the planar electrode leaves 11, the electrode 22, 22' collects piezoelectric charges from a plurality of, preferably three piezoelectric elements 23, 23', 23". With respect to the longitudinal axis BB', the piezoelectric elements 23, 23', 23" are rectangular in cross section and are made of piezoelectric materials such as quartz ($SiO_2$ single crystal), calcium gallo germanate ($Ca_3Ga_2Ge_4O_{14}$ or CGG), langasite ($La_3Ga_5SiO_{14}$ or LGS), tourmaline, gallium orthophosphate, piezoceramics, etc. The piezoelectric elements 23, 23', 23" are cut in a crystallographic orientation that ensures a high sensitivity for the force to be detected. Preferably, the piezoelectric material has a high sensitivity for the longitudinal or transversal shear effect. To this end, the orientation of the piezoelectric elements 23, 23', 23" is such that negative and positive piezoelectric charges are generated on surfaces which are perpendicular or parallel to an axis of shear stress, respectively. In FIG. 5, the positive and negative piezoelectric charges are respectively indicated by + and − designations. These piezoelectric charges can be electrically picked up as acceleration signals. Those skilled in the art knowing the present invention may provide other cross sectional shapes such as a circle, etc., for the electrical insulator components, the electrodes and the piezoelectric elements.

In the diagram showing the piezoelectric system 2 according to FIG. 5, three piezoelectric elements 23 23', 23" are arranged between two electrical insulator elements 21, 21'. A first electrical insulator element 21 is facing away from the center O and a second electrical insulator element 21' is facing the center O. In FIGS. 1 to 4, these five elements 21, 23, 23', 23", 21' are as shown as a stack that is arranged within each of the recesses 32, 32'. The dimensions of each of these recesses 32, 32' are such that they essentially completely accommodate each of the respective system elements 20, 20'. The adverb "essentially" includes an inaccuracy of ±10%. Thus, the piezoelectric system 2 and the seismic mass 3 are built to save space, i.e. the piezoelectric system 2 is arranged with maximum space utilization within a spherical surface of the seismic mass 3.

Two electrodes 22, 22' are arranged with their three electrode leaves 11 on the surfaces of the piezoelectric elements 23, 23', 23". Preferably, the electrodes 22, 22' are identically configured. A positive electrode 22 receives positive piezoelectric charges from the surfaces of the piezoelectric elements 23, 23', 23" while a negative electrode 22' receives negative piezoelectric charges from the surfaces of the piezoelectric elements 23, 23', 23". As schematically shown in FIG. 5, one end 24, 24' of each of the electrodes 22, 22' is electrically and mechanically connected to a mass element 30, 30'. The positive electrode 22 is electrically and mechanically connected via its end 24 to the first mass element 30 that is the upper one with respect to the center O and the vertical axis AA'. The negative electrode 22' is electrically and mechanically connected via its end 24' to the second mass element 30' being the lower one with respect to the center O and the vertical axis AA'. The electrical and mechanical connections are achieved by means of an interference fit such as a press fit, friction fit, etc. at surfaces of the mass elements 30, 30'. In this way, negative and positive piezoelectric charges are electrically picked up as acceleration signals by the electrodes 22, 22' due to the forces transmitted from the mass elements 30, 30' to the piezoelectric elements 23, 23', 23'' and the electric charges electrically transmitted from the piezoelectric elements 23, 23', 23'' to the electrodes 22, 22' via the mass elements 30, 30'.

Figure 3:
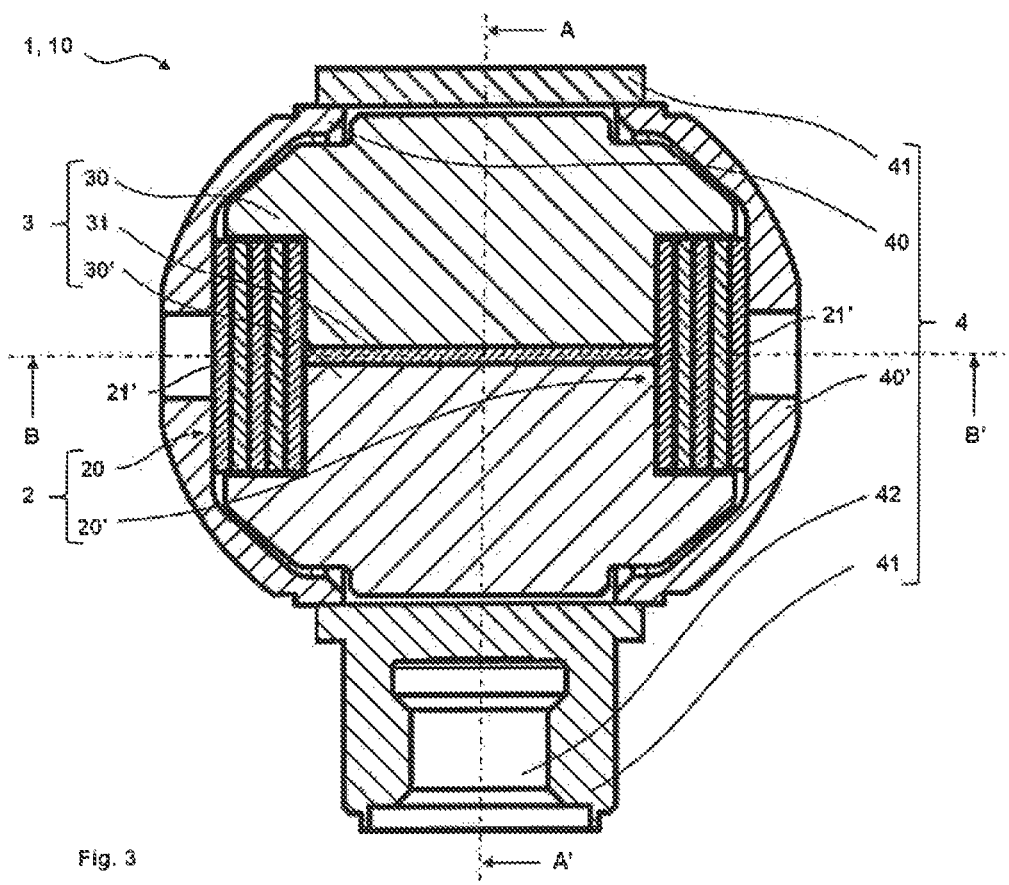
FIG. 3 shows a piezoelectric transducer assembly of the acceleration measuring device according to FIG. 1 or 2 in cross section prior to mechanical preloading by means of the preloading assembly.
Figure 4:
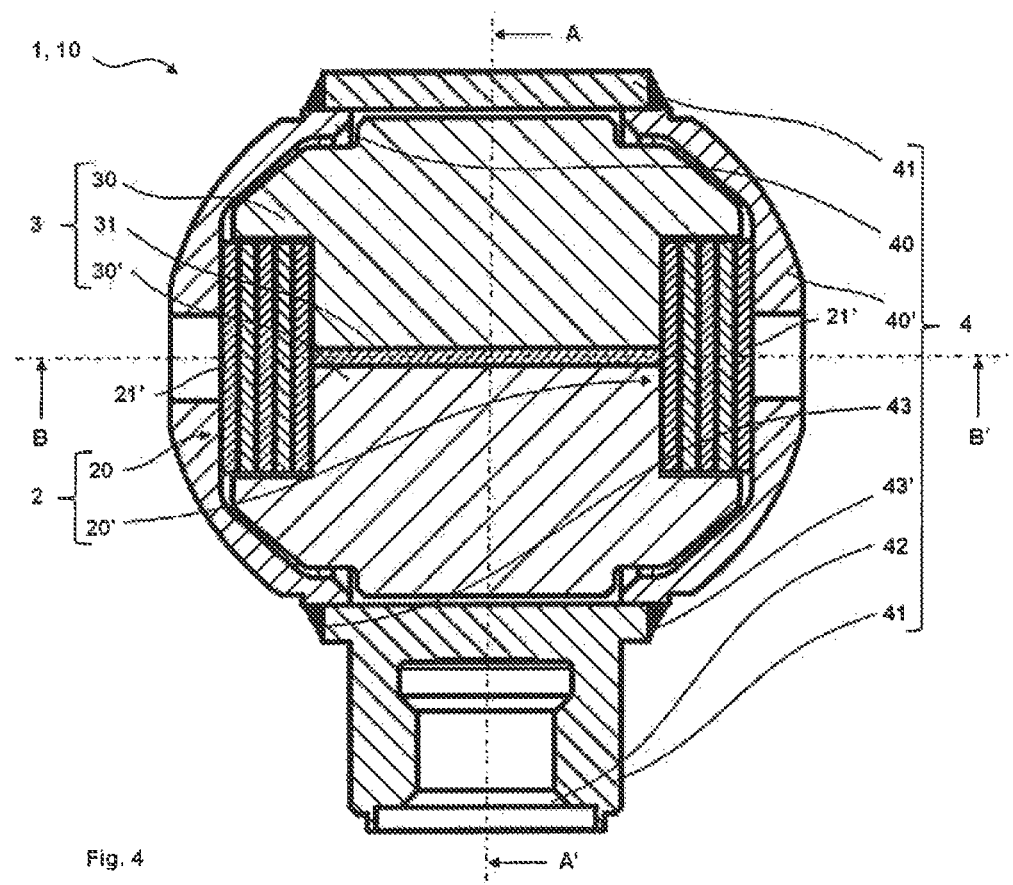
FIG. 4 shows the piezoelectric transducer assembly according to FIG. 3 in cross section after mechanical preloading by means of the preloading assembly.

The acceleration measuring device 1 comprises a preloading assembly 4 consisting of two covers 40, 40' and a sleeve 41. As shown in FIGS. 3 and 4, the covers 40, 40' are curved in cross section with respect to the longitudinal axis BB' while the shape of sleeve 41 is hollow cylindrical in cross section with respect to the longitudinal axis BB'. Preloading assembly 4 is made of mechanically rigid materials such as pure metals, nickel alloys, cobalt alloys, iron alloys, etc. However, those skilled in the art knowing the present invention may also provide covers and a sleeve having different cross sectional shapes such as a polygon, etc. Preferably, the covers 40, 40' are identically configured. The sleeve 41 comprises a fastening element 42. The fastening element 42 ensures a mechanical connection to a measured object, which is not represented in the FIGS. The mechanical connection is a mechanical force-locking connection such as a screw connection, etc.

Preloading assembly 4 substantially completely encloses the seismic mass 3 and the piezoelectric system 2. As schematically shown in FIGS. 3 and 4, each of the covers 40, 40' encloses portions of an outer surface of the seismic mass 3. With respect to the center O and the longitudinal axis BB', a first cover 40 on the left encloses portions of a first outer surface of the seismic mass 3, and a second cover 40' on the right encloses portions of a second outer surface of the seismic mass 3. With respect to the center O and the longitudinal axis BB', the sleeve 41 surrounds a central portion of the seismic mass 3. The covers 40, 40' and sleeve 41 partially overlap. With respect to the center O and the longitudinal axis BB', the first cover 40 on the left overlaps a first end portion of sleeve 41, and the second cover 40' on the right overlaps a second end portion of sleeve 41. In the region of the system elements 20, 20', the covers 40, 40 are in direct mechanical contact with the system elements 20, 20'. With respect to the center O and the longitudinal axis BB', the first cover 40 on the left is in mechanical contact with a second electrical insulator element 21' of the first system element 20, and the second cover 40' on the right is in mechanical contact with a second electrical insulator element 21' of the second system element 20'. This mechanical contact is a surface contact over outer surfaces of the second electrical insulator elements 21' facing away from the center O. Mechanical preloading is achieved by applying a clamping force over the outer surfaces of the second electrical insulator elements 21'. Compared to the state of the art as described in the document CH399021A the clamping force is applied to a much larger cross sectional area. The clamping sleeve according to document CH399021A applies the clamping force to the seismic mass via a ring-shaped protrusion having a small cross sectional area. Due to the substantially larger cross sectional area according to the invention a correspondingly higher clamping force can be applied, preferably the clamping force is 100% higher, preferably it is 500% higher than that of the prior art according to data sheet 8002_00_205d_07.05.

FIGS. 3 and 4 show steps of a process for mechanical preloading of the piezoelectric system 2 in cross section. In a first process step, the electrical insulation 31 is arranged between the mass elements 30, 30' with respect to the vertical axis AA'. Afterwards, the system elements 20, 20' are arranged in recesses 32, 32' between the mass elements 30, 30' with respect to the vertical axis AA'. In another step, one end of each electrode 22, 22' is electrically and mechanically connected to one of the mass elements 30, 30'. Subsequently, the covers 40, 40' and sleeve 41 are placed over the seismic mass 3. This results in overlapping of the covers 40, 40' with the end portions of the sleeve 41. In yet another process step, the covers 40, 40' preload the system elements 20, 20' mechanically against the mass elements 30, 30'. In this mechanically preloaded state, the covers 40, 40' are material-bonded to the sleeve 41 in the regions of the end portions of the sleeve 41. Material-bonding is achieved by welding, diffusion welding, thermocompression bonding, soldering, etc. As shown in FIG. 4, the covers 40, 40' are each mechanically connected to the sleeve 41 by annular welds 43, 43'. Welds 43, 43' are readily accessible for a joining tool and thus easily produced. In addition, welds 43, 43' are fabricated at radial ends of the curved covers 40, 40' so that their radius is relatively large in size and accordingly keeping welding residual stresses low.

The piezoelectric system 2, seismic mass 3 and preloading assembly 4 form a piezoelectric transducer assembly 10. Prior to its assembly in the housing 5, the piezoelectric transducer assembly 10 can be electrically and mechanically tested as well as stored.

Figure 2:
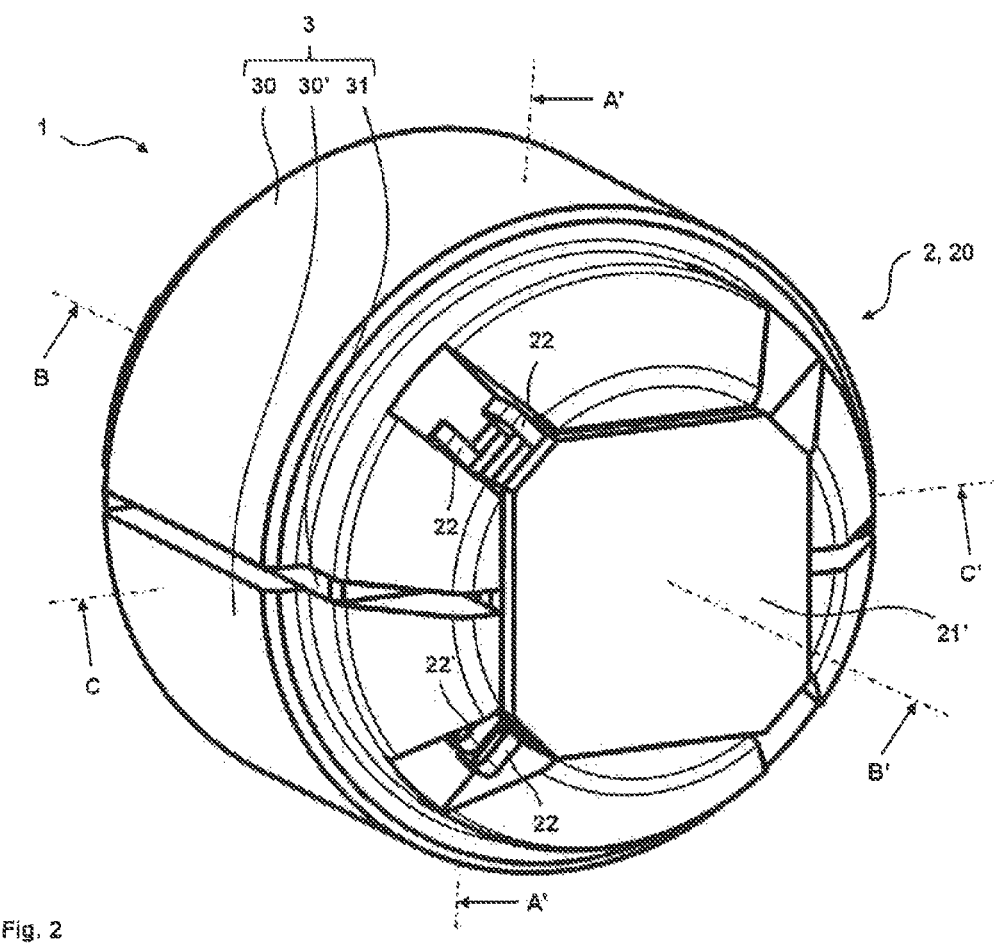
FIG. 2 shows a perspective view of a portion of the acceleration measuring device according to FIG. 1 without the preloading assembly, housing and cover.
Figure 7:
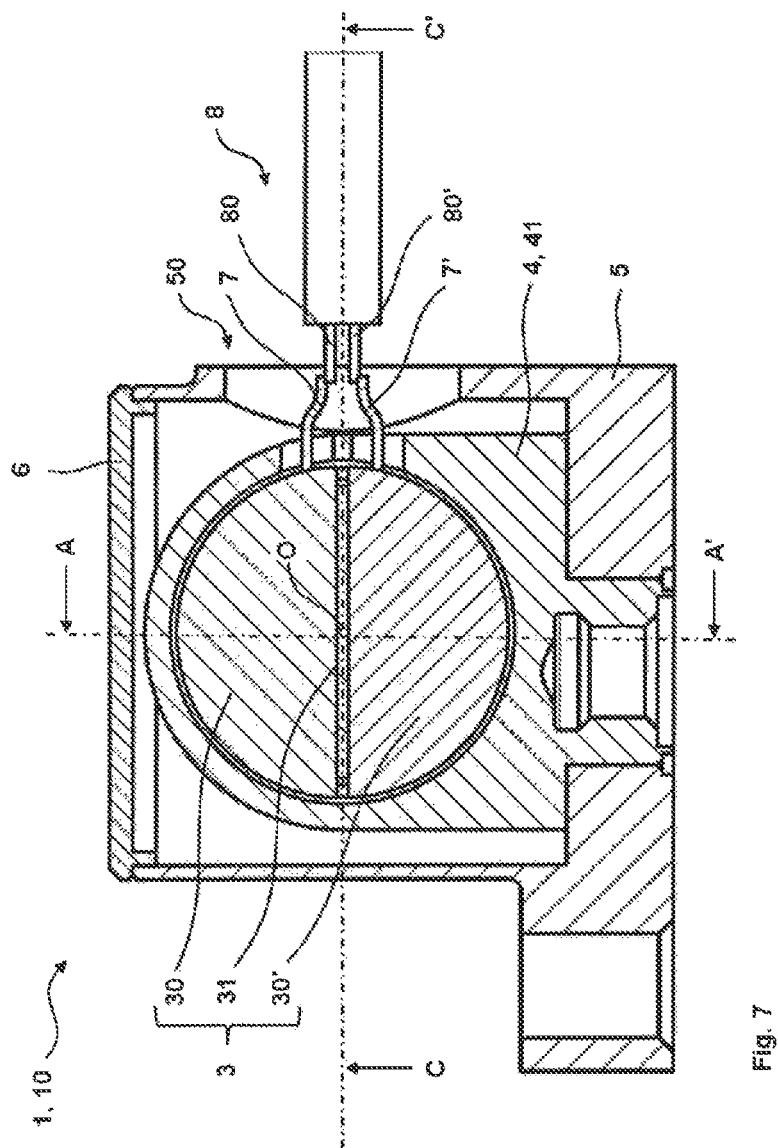
FIG. 7 shows a portion of the acceleration measuring instrument according to FIG. 1 or 2 in cross section with electrical contacts and signal cable.
Figure 8:
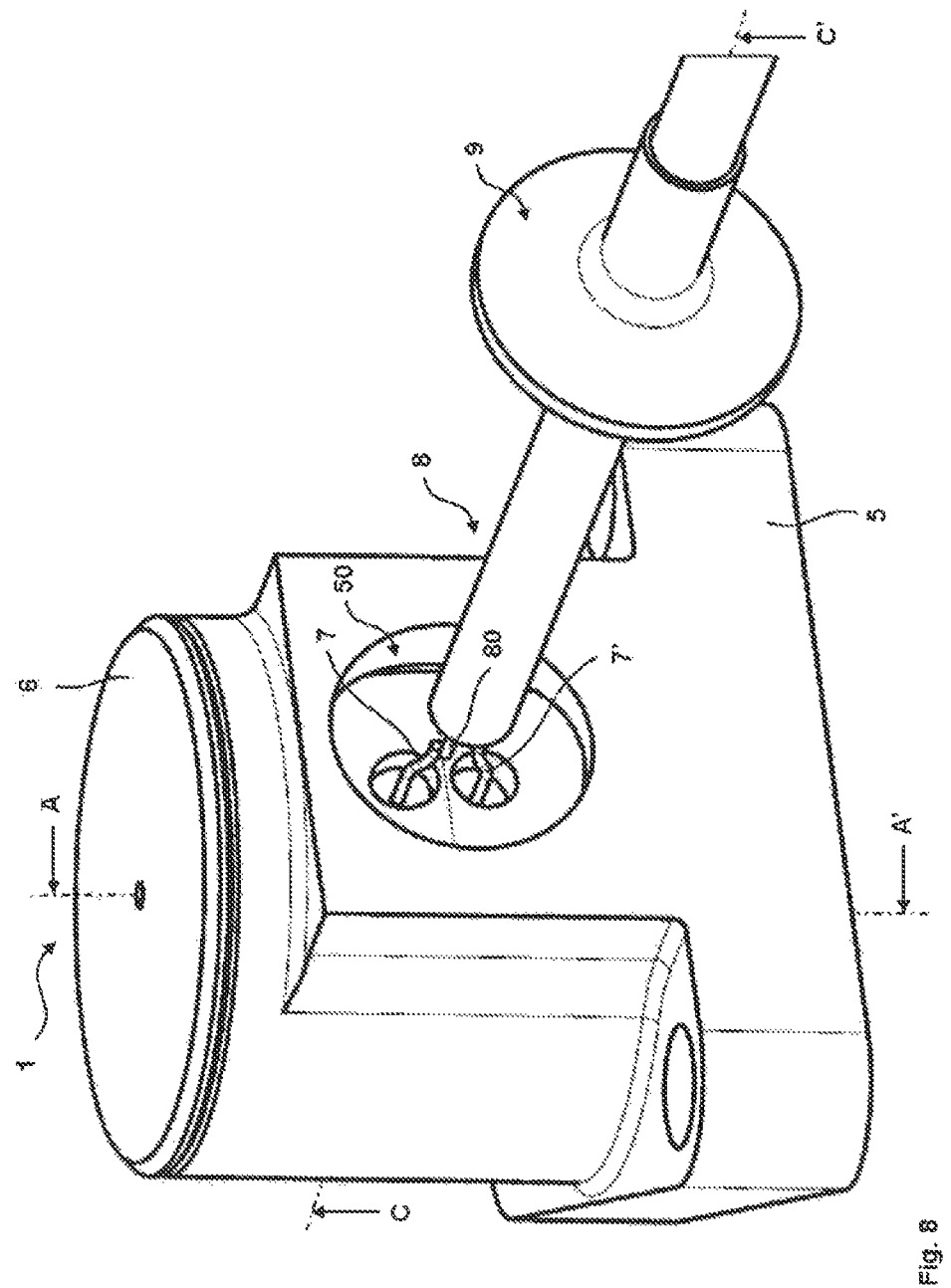
FIG. 8 shows a perspective view of the acceleration measuring device according to FIG. 7 prior to mounting of the protective sleeve.
Figure 9:
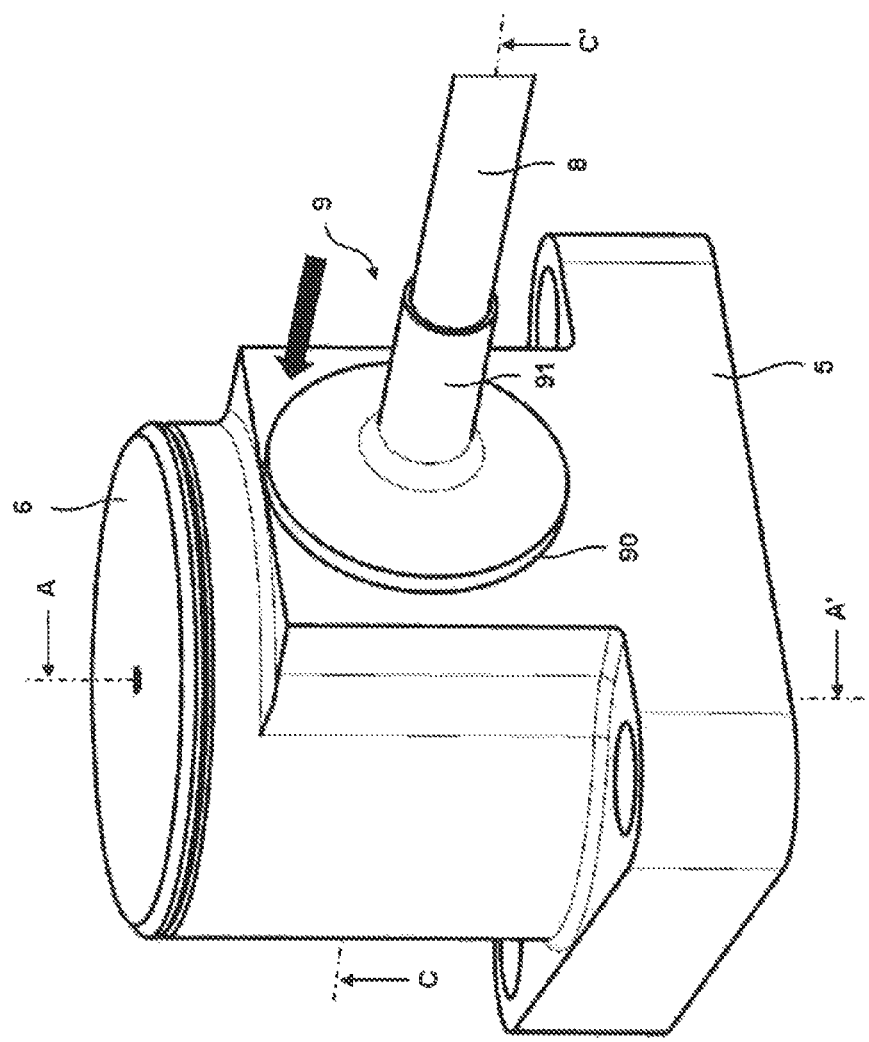
FIG. 9 shows the perspective view of the acceleration measuring device according to FIG. 8 after mounting of the protective sleeve.

FIG. 7 shows a portion of the embodiment of the acceleration measuring device 1 according to FIGS. 1 and 2 in cross section along the horizontal axis CC'. FIGS. 8 and 9 show the corresponding perspective views. The piezoelectric transducer assembly 10 is mounted in the housing 5. For this purpose, in a first process step the piezoelectric transducer assembly 10 is introduced into housing 5 and is attached by material bonding in the region of sleeve 41 to a bottom portion of housing 5 with respect to the center O. The material bond is achieved by welding, diffusion welding, thermocompression bonding, soldering, etc. In another process step, the cover 6 is mounted on an upper edge of the housing 5 with respect to the center O and is material bonded to the housing 5. This material bond is also achieved by welding, diffusion welding, thermocompression bonding, soldering, etc.

Housing 5 comprises an opening 50 at the end on the horizontal axis CC' with respect to the center O. Mass elements 30, 30' are accessible from the outside of the housing 5 through this opening. In a further process step, electrical contact elements 7, 7' are electrically and mechanically connected to the mass elements 30, 30'. The electrical contact elements 7, 7' are cylindrical in shape and consist of electrically conductive materials such as pure metals, nickel alloys, cobalt alloys, iron alloys, etc. The electrical and mechanical connection is made by material bonding such as welding, diffusion welding, thermocompression bonding, soldering, etc. In the embodiment shown in FIGS. 7 and 8, the electrical contact elements 7, 7' are short wires extending from a surface of the mass elements 30, 30' into the region of the opening 50. Short wires have the advantage that they are very resistant to mechanical stresses in operation and, thus, are durable as well as cost-effective.

Via a signal cable 8 the acceleration measuring device 1 can be electrically connected to an evaluation unit (not shown). The acceleration signals can be electrically amplified and evaluated in the evaluation unit. The signal cable 8 comprises a signal cable sheath and two electrical signal conductors 80, 80'. The signal cable sheath protects the electrical signal conductors 80, 80' from harmful environmental conditions such as contamination (dust, moisture, etc.). The signal cable sheath may comprise a coaxial electromagnetic shielding and may protect the signal conductors from electric and electromagnetic interference effects in the form of electromagnetic radiation. The electrical signal conductors 80, 80' are made of electrically conductive materials such as pure metals, nickel alloys, cobalt alloys, iron alloys, etc. The front ends of the electrical signal conductors 80, 80' with respect to the center O are electrically and mechanically connected to the electrical contact elements 7, 7'. Any electrical and mechanical connection may be used such as material bonding, form-fit and interference-fit. In this way, the electrical signal conductors 80, 80' are in indirect electrical and mechanical connection to the mass elements 30, 30'. Acceleration signals are electrically transmitted in an indirect manner by the mass elements 30, 30' via the electrical contact elements 7, 7' to the electrical signal conductors 80, 80'. However, those skilled in the art knowing the present invention may also provide the electrical contact elements 7, 7' and the electrical signal conductors 80, 80' as a single piece, and may also design the connection between the electrical signal conductors 80, 80' and the mass elements 30, 30' as a direct electrical and mechanical connection. In this case, acceleration signals will be directly electrically transmitted from the mass elements 30, 30' to electrical signal conductors 80, 80'.

The acceleration measuring device 1 comprises a protective sleeve 9. Protective sleeve 9 is hollow cylindrical in shape and is made of mechanically resistant material such as pure metals, nickel alloys, cobalt alloys, iron alloys, plastics, ceramics, etc. In further process steps, opening 50 is sealed by the sleeve 9 and the signal cable 8 is strain relieved. For this purpose the protective sleeve 9 is pulled over cable 8 as shown in FIGS. 8 and 9. After the electrical signal conductors have been electrically and mechanically connected to the electrical contact elements 7, 7', the protective sleeve 9 is pulled against the housing 5 as schematically indicated by an arrow in FIG. 9. The protective sleeve comprises a disc 90 and a tube 91. Disc 90 and tube 91 are made of a single piece. A diameter of disc 90 is sufficient to completely seal the opening 50 by the disc 90. Afterwards, a radially outer edge of disc 90 is mechanically connected to the housing 5. The mechanical connection is carried out by material bonding such as welding, diffusion welding, thermocompression bonding, soldering, etc. In this way, the mechanical connection creates a gas-tight seal of the opening 50. Furthermore, tube 91 has a diameter that is slightly larger than an outer diameter of the signal cable sheath. The tube 91 and signal cable sheath are then mechanically connected to each other. The mechanical connection is carried out by material bonding such as bonding, soldering, etc., or by force-fit such as crimping, clamping, etc. The mechanical connection provides a strain relief of the electrical and mechanical connection of the electrical signal conductors 80, 80' to the electrical contact elements 7, 7'.

The materials from which the components of the acceleration measuring device 1 are made are such that an operating temperature in the range of −70° C. up to +700'C is achieved. Therefore, the materials for fabricating the housing 5, cover 6, mass elements 30, 30', electrodes 22, 22', preloading assembly 4 are preferably selected from nickel alloys having the material numbers 2.4969 or 2.4632.

LIST OF REFERENCE NUMERALS

AA' vertical axis
BB' longitudinal axis
CC' horizontal axis
O center
1 acceleration measuring instrument
2 piezoelectric system
3 seismic mass
4 preloading assembly
5 housing
6 cover
7, 7' electrical contact element
8 signal cable
9 protective sleeve
10 piezoelectric transducer assembly
11 leaves of electrodes 22, 22'
20, 20' system element
21, 21' electrical insulator element
22, 22' electrode
23, 23', 23" piezoelectric element
24, 24' end of electrode
25 hinges of electrodes 22, 22'
30, 30' mass element
31 electrical insulation
32, 32' recess
40, 40' cover
41 sleeve
42 fastening element
43, 43' weld
50 opening
80, 80' electrical signal conductor
90 disc
91 tube

The invention claimed is:

1. An acceleration measuring device comprising:
a piezoelectric system including a first system element and a second system element, wherein the first system element includes a first piezoelectric element, wherein the second system element includes a second piezoelectric element spaced apart in a first direction from the first piezoelectric element;
a seismic mass including a first mass element and a second mass element spaced apart from the first mass element in a second direction that is perpendicular to the first direction, and
a preloading assembly configured to preload the first system element mechanically against the first mass element and preload the first system element mechanically against the second mass element and preload the second system element mechanically against the first mass element and preload the second system element mechanically against the second mass element, wherein the preloading assembly is made of mechanically rigid metal material and is disposed to apply a preloading force in the first direction;
wherein during acceleration the seismic mass exerts a force proportional to its acceleration onto the piezoelectric system, said force generating piezoelectric charges in the piezoelectric system, and wherein said piezoelectric charges can be electrically picked up as the acceleration signals.

2. The acceleration measuring device according to claim 1, wherein the system elements, the mass elements, and the preloading assembly form a piezoelectric transducer assembly.

3. The acceleration measuring device according to claim 1, wherein under mechanical preload the preloading assembly is in direct mechanical contact to the system elements.

4. The acceleration measuring device according to claim 1, wherein the mass elements are electrically insulated against each other by means of an electrical insulation.

5. The acceleration measuring device according to claim 1, wherein the first system element comprises a positive electrode and the second system element includes a negative electrode; the positive electrode receives positive piezoelectric charges; the negative electrode receives negative piezoelectric charges; said positive electrode being electrically and mechanically connected to the first mass element; said negative electrode being electrically and mechanically connected to the second mass element; and wherein piezoelectric charges can be picked up as acceleration signals at the mass elements.

6. The acceleration measuring device according to claim 5, further comprising a housing defining an opening; and wherein the mass elements are configured for being electrically and mechanically connected to a signal cable through said opening.

7. The acceleration measuring device according to claim 6, further comprising a signal cable that includes two electrical signal conductors; said electrical signal conductors being electrically and mechanically connected to the mass elements; and wherein said electrical signal conductors are configured to electrically transmit acceleration signals from the mass elements.

8. The acceleration measuring device according to claim 5, wherein each electrode comprises a plurality of electrode leaves that are mechanically connected to one another by hinges; and wherein each electrode collects piezoelectric charges from a plurality of piezoelectric elements.

9. The acceleration measuring device, comprising:
a piezoelectric system including a first system element and a second system element, wherein the first system element includes a first piezoelectric element, wherein the second system element includes a second piezoelectric element;
a seismic mass including a first mass element and a second mass element; and
a preloading assembly configured to preload the first piezoelectric element mechanically against the first mass element and preload the second piezoelectric element mechanically against the second mass element, wherein under mechanical preload the preloading assembly is in direct mechanical contact to the system elements;
wherein during acceleration the seismic mass exerts a force proportional to its acceleration onto the piezoelectric system, said force generating piezoelectric charges in the piezoelectric system, and wherein said piezoelectric charges can be electrically picked up as acceleration signals; and
wherein the preloading assembly comprises two covers and a sleeve; said covers and sleeve being placed over the seismic mass; and wherein the covers being placed over the seismic mass are material-bonded to the sleeve being placed over the seismic mass under mechanical preload.

10. The acceleration measuring device according to comprising:
a piezoelectric system including a first system element and a second system element, wherein the first system element includes a first piezoelectric element, wherein the second system element includes a second piezoelectric element;
a seismic mass including a first mass element and a second mass element, wherein each of the mass elements defines a recess; and
a preloading assembly configured to preload the first piezoelectric element mechanically against the first mass element and preload the second piezoelectric element mechanically against the second mass element, wherein under mechanical preload the preloading assembly is in direct mechanical contact to the system elements;
wherein during acceleration the seismic mass exerts a force proportional to its acceleration onto the piezoelectric system, said force generating piezoelectric charges in the piezoelectric system, and wherein said piezoelectric charges can be electrically picked up as acceleration signals; and
wherein the system elements are arranged in the recesses of the mass elements.

11. A method for manufacturing an acceleration measuring device that includes a piezoelectric system, a seismic mass and a preloading assembly, wherein the preloading assembly is made of mechanically rigid metal material, wherein the piezoelectric system includes a first system element and a second system element, the first system element including a first piezoelectric element, the second system element including a second piezoelectric element, wherein the seismic mass includes a first mass element and a second mass element, the method comprising the steps of:
arranging the system elements between the mass elements; and
installing the preloading assembly so as to preload the first system element mechanically against the first mass element, preload the first system element mechanically against the second mass element, preload the second system element mechanically against the first mass element and preload the second system element mechanically against the second mass element.

12. A method for manufacturing an acceleration measuring device that includes a piezoelectric system, a seismic mass and a preloading assembly, wherein the piezoelectric system includes a first system element and a second system element, the first system element including a first piezoelectric element, the second system element including a second piezoelectric element, wherein the seismic mass includes a first mass element and a second mass element, the method comprising the steps of:
arranging the system elements between the mass elements;
installing the preloading assembly so as to preload the first system element mechanically against the first mass element, preload the first system element mechanically against the second mass element, preload the second system element mechanically against the first mass element and preload the second system element mechanically against the second mass element; and
wherein the step of installing the preloading assembly includes placing two covers and a sleeve over the seismic mass; and wherein the covers being placed over the seismic mass are material-bonded to the sleeve being placed over the seismic mass under mechanical preload.

13. The method according to claim 12, wherein the system elements, mass elements, and preloading assembly form a piezoelectric transducer assembly, and said piezoelectric transducer assembly is introduced in a housing of the acceleration measuring device; wherein said preloading assembly is material-bonded to a bottom portion of the housing; a cover of the acceleration measuring device is mounted on an upper edge of the housing; and said cover is material-bonded to the upper edge of the housing.

14. The method according to claim 12, wherein the system elements are electrically connected to the mass elements; a housing of the acceleration measuring device has an opening; and wherein the mass elements are electrically and mechanically connected to a signal cable through said opening.

\* \* \* \* \*